(12) United States Patent
Tsuchiya et al.

(10) Patent No.: US 11,922,319 B2
(45) Date of Patent: Mar. 5, 2024

(54) IMAGE DETERMINATION DEVICE, TRAINING METHOD AND NON-TRANSITORY COMPUTER READABLE MEDIUM STORING PROGRAM

(71) Applicant: OMRON Corporation, Kyoto (JP)

(72) Inventors: Naoki Tsuchiya, Otsu (JP); Yoshihisa Ijiri, Tokyo (JP); Yu Maruyama, Tokyo (JP); Yohei Okawa, Koshigaya (JP); Kennosuke Hayashi, Tokyo (JP); Sakon Yamamoto, Tokyo (JP)

(73) Assignee: OMRON Corporation, Kyoto (JP)

( * ) Notice: Subject to any disclaimer, the term of this patent is extended or adjusted under 35 U.S.C. 154(b) by 323 days.

(21) Appl. No.: 17/270,051

(22) PCT Filed: Oct. 24, 2019

(86) PCT No.: PCT/JP2019/041591
§ 371 (c)(1),
(2) Date: Feb. 22, 2021

(87) PCT Pub. No.: WO2020/137123
PCT Pub. Date: Jul. 2, 2020

(65) Prior Publication Data
US 2021/0326648 A1 Oct. 21, 2021

(30) Foreign Application Priority Data
Dec. 27, 2018 (JP) .................................. 2018-245678

(51) Int. Cl.
*G06N 3/084* (2023.01)
*G06F 18/21* (2023.01)
(Continued)

(52) U.S. Cl.
CPC ........... *G06N 3/084* (2013.01); *G06F 18/214* (2023.01); *G06F 18/217* (2023.01); *G06V 10/40* (2022.01);
(Continued)

(58) Field of Classification Search
CPC ..... G06N 3/084; G06F 18/214; G06F 18/217; G06V 10/40; G06V 10/771; G06V 10/774; G06V 10/776; G06V 2201/06
(Continued)

(56) References Cited

U.S. PATENT DOCUMENTS

2002/0165839 A1    11/2002  Taylor et al.
2017/0069075 A1*    3/2017  Okuda ................. G06V 10/764
(Continued)

FOREIGN PATENT DOCUMENTS

CN        103196914       7/2013
CN        107123106       9/2017
(Continued)

OTHER PUBLICATIONS

Lien, "Product Surface Defect Detection Based on Deep Learning," Publisher: IEEE Aug. 12-15, 2018 (Year: 2018).*
(Continued)

*Primary Examiner* — Juan A Torres
(74) *Attorney, Agent, or Firm* — JCIPRNET (57) ABSTRACT

Provided is an image determination device. The image determination device is provided with: feature extractors which output, on the basis of an image to be examined, each piece of feature data indicating a specific feature of the image; a determiner which outputs, on the basis of the feature data output from the extractors, output data indicating the determination result pertaining to the image; and a training part which trains the determiner so as to output, output data indicating the label data associated with the (Continued)

training image on the basis of the feature data output when the training image is input to the extractors, wherein the training part further trains, by using new training data, the determiner so that the output data indicating the label data associated with the image is output by the determiner.

15 Claims, 7 Drawing Sheets

(51) Int. Cl.
*G06F 18/214* (2023.01)
*G06V 10/40* (2022.01)
*G06V 10/771* (2022.01)
*G06V 10/774* (2022.01)
*G06V 10/776* (2022.01)

(52) U.S. Cl.
CPC .......... *G06V 10/771* (2022.01); *G06V 10/774* (2022.01); *G06V 10/776* (2022.01)

(58) Field of Classification Search
USPC ........................................................ 382/159
See application file for complete search history.

(56) References Cited

U.S. PATENT DOCUMENTS

| 2018/0218283 | A1 | 8/2018 | Jenson |
| 2019/0034762 | A1* | 1/2019 | Hashimoto .......... G06V 10/764 |
| 2021/0174133 | A1* | 6/2021 | Nitsch .................. G06F 18/217 |

FOREIGN PATENT DOCUMENTS

| CN | 108876761 | 11/2018 |
| JP | 2014022837 | 2/2014 |
| JP | 2016057925 | 4/2016 |
| JP | 2017049974 | 3/2017 |
| JP | 2018005639 | 1/2018 |
| JP | 2018005640 | 1/2018 |

OTHER PUBLICATIONS

Anastasios D. Doulamis et al., "Retrainable neural networks for image analysis and classification," IEEE International Conference on Systems, Man and Cybernetics, Oct. 1997, pp. 3558-3563.

"Search Report of Europe Counterpart Application", dated Aug. 16, 2022, p. 1-p. 11.

"International Search Report (Form PCT/ISA/210) of PCT/JP2019/041591," dated Jan. 28, 2020, with English translation thereof, pp. 1-4.

"Written Opinion of the International Searching Authority (Form PCT/ISA/237) of PCT/JP2019/041591," dated Jan. 28, 2020, with English translation thereof, pp. 1-6.

"Office Action of China Counterpart Application", dated Nov. 30, 2023, with English translation thereof, pp. 1-16.

* cited by examiner

IMAGE DETERMINATION DEVICE, TRAINING METHOD AND NON-TRANSITORY COMPUTER READABLE MEDIUM STORING PROGRAM

CROSS-REFERENCE TO RELATED APPLICATION

This application is a 371 application of the International PCT application serial no. PCT/JP2019/041591, filed on Oct. 24, 2019, which claims the priority benefits of Japan Patent Application No. 2018-245678, filed on Dec. 27, 2018. The entirety of each of the above-mentioned patent applications is hereby incorporated by reference herein and made a part of this specification.

TECHNICAL FIELD

The present invention relates to an image determination device, a training method, and a non-transitory computer readable medium storing an image determination program.

BACKGROUND ART

In the related art, automatic control using image processing has been widely put into practical use in the field of factory automation (FA). For example, a step of capturing an image of an examination target such as a work piece and examining the quality of the work piece on the basis of a feature amount extracted from the captured image is realized.

For example, Patent Literature 1 discloses a device that determines whether or not there is a defect, which is an examination target, on the basis of an output result of an identification device that trains using an image to be examined and captured under a plurality of imaging conditions for training data. Specifically, the device disclosed in Patent Literature 1 includes a training extraction means, a selection means, and a generation means. The training extraction means extracts a feature amount of each of at least two images based on images captured under at least two different imaging conditions with respect to an object whose exterior quality is known. The selection means selects a feature amount for determining the quality of an object from the feature amount spanning the feature amounts extracted from the at least two images by the training extraction means. The generation means generates an identification device for determining the quality of an object on the basis of the feature amount selected by the selection means.

LITERATURE OF RELATED ART

Patent Literature

[Patent Literature 1]
Japanese Patent Laid-Open No. 2017-49974

SUMMARY

Technical Problem

In a case where determination regarding the presence or absence of a defect, the type of work piece, or the like is performed on an image to be examined using a training model, it may be clarified what features of the image are focused on to obtain a determination result. However, in a case where additional training of a training model is performed using newly obtained training data, it may be unclear whether or not the determination is performed by paying attention to the initially assumed features, and it may not be possible to explain what features of the image are focused on to obtain the determination result.

Consequently, the present invention provides an image determination device, a training method, and a non-transitory computer readable medium storing an image determination program for clarifying what features of an image are focused on to obtain a determination result even when additional training of a training model is performed.

Solution to Problem

An image determination device according to an aspect of the present invention includes one or a plurality of feature extractors each of which outputs feature data indicating a specific feature of an image to be examined on the basis of the image, a determiner which outputs output data indicating a determination result related to the image on the basis of the feature data output from the one or plurality of feature extractors, and a training part which causes the determiner to train so as to output the output data indicating label data associated with a training image, on the basis of the feature data which is output in a case where the training image is input to the one or plurality of feature extractors by using training data including the training image and the label data, in which the training part performs additional training of the determiner so that the output data indicating the label data associated with the image by the determiner is output, on the basis of the feature data which is output in a case where the image to be examined included in new training data is input to the one or plurality of feature extractors by using the new training data.

According to the aspect, each of the one or plurality of feature extractors extracts a specific feature of an image, and thus it becomes clear what features of the image are focused on to obtain a determination result even when the determiner is updated through additional training. Thereby, even when additional training of a training model is performed, it becomes clear what features of the image are focused on to obtain a determination result.

In the above-described aspect, the training part may perform the additional training of the determiner by executing at least any one of updating of parameters of the determiner and updating of a weight of the feature data which is input to the determiner.

According to the aspect, it is possible to update the determiner so that a determination result is obtained with higher accuracy through additional training.

In the above-described aspect, the training part may update parameters of some feature extractors of the one or plurality of feature extractors together with the additional training of the determiner.

According to the aspect, some feature extractors of the one or plurality of feature extractors are collectively updated through additional training, and thus it is possible to update the determiner so that feature extraction is performed with higher accuracy and a determination result is obtained with higher accuracy.

In the above-described aspect, the image determination device may further include an editing part which edits the one or plurality of feature extractors on the basis of an input.

According to the aspect, it is possible to execute image determination suitable for an usage environment by flexibly changing features of an image to be extracted.

In the above-described aspect, the editing part may add a new feature extractor that outputs the feature data indicating the specific feature of the image on the basis of the input.

According to the aspect, it is possible to perform additional training of a training model by clarifying the features of an image added to an input to the determiner.

In the above-described aspect, the editing part may delete some of the one or plurality of feature extractors on the basis of the input.

According to the aspect, it is possible to perform additional training of a training model by clarifying the features of an image deleted from an input to the determiner.

In the above-described aspect, the editing part may edit parameters of the one or plurality of feature extractors on the basis of the input.

According to the aspect, it is possible to perform additional training of a training model by clarifying change points related to features of an image input to the determiner.

A training method according to another aspect of the present invention includes causing a determiner to train so as to output output data indicating label data associated with a training image, on the basis of feature data which is output in a case where the training image is input to one or a plurality of feature extractors by using training data including the training image and the label data, the determiner outputting the output data indicating a determination result related to an image to be examined, on the basis of the feature data output from the one or plurality of feature extractors each outputting the feature data indicating a specific feature of the image on the basis of the image, and causing the training part to perform additional training of the determiner so that the output data indicating the label data associated with the image by the determiner is output, on the basis of the feature data which is output in a case where the image to be examined included in new training data is input to the one or plurality of feature extractors by using the new training data.

According to the aspect, each of the one or plurality of feature extractors extracts a specific feature of an image, and thus it becomes clear what features of the image are focused on to obtain a determination result even when the determiner is updated through additional training. Thereby, even when additional training of a training model is performed, it becomes clear what features of the image are focused on to obtain a determination result.

A non-transitory computer readable medium storing an image determination program according to still another aspect of the present invention causes a computation part included in an image determination device to function as one or a plurality of feature extractors each of which outputs feature data indicating a specific feature of an image to be examined on the basis of the image, a determiner which outputs output data indicating a determination result related to the image on the basis of the feature data output from the one or plurality of feature extractors, and a training part which causes the determiner to train so as to output the output data indicating label data associated with a training image, on the basis of the feature data which is output in a case where the training image is input to the one or plurality of feature extractors by using training data including the training image and the label data, in which the training part performs additional training of the determiner so that the output data indicating the label data associated with the image by the determiner is output, on the basis of the feature data which is output in a case where the image to be examined included in new training data is input to the one or plurality of feature extractors by using the new training data.

According to the aspect, each of the one or plurality of feature extractors extracts a specific feature of an image, and thus it becomes clear what features of the image are focused on to obtain a determination result even when the determiner is updated through additional training. Thereby, even when additional training of a training model is performed, it becomes clear what features of the image are focused on to obtain a determination result.

Advantageous Effects of Invention

According to the present invention, it is possible to provide an image determination device, a training method, and a non-transitory computer readable medium storing an image determination program for clarifying what features of an image are focused on to obtain a determination result even when additional training of a training model is performed.

DESCRIPTION OF THE EMBODIMENTS

Hereinafter, an embodiment according to an aspect of the present invention (hereinafter, also referred to as "the present embodiment") will be described with reference to the accompanying drawings. However, the embodiment to be described below is merely an example of the present invention in all respects. It is needless to say that various improvements and modifications can be made without departing from the scope of the present invention. That is, a specific configuration according to the embodiment may be appropriately adopted when implementing the present invention. Meanwhile, data appearing in the present embodiment is described in natural language, but more specifically designated in a pseudo language, commands, parameters, machine language, or the like that can be recognized by a computer.

§ 1 Application Example

Figure 1:
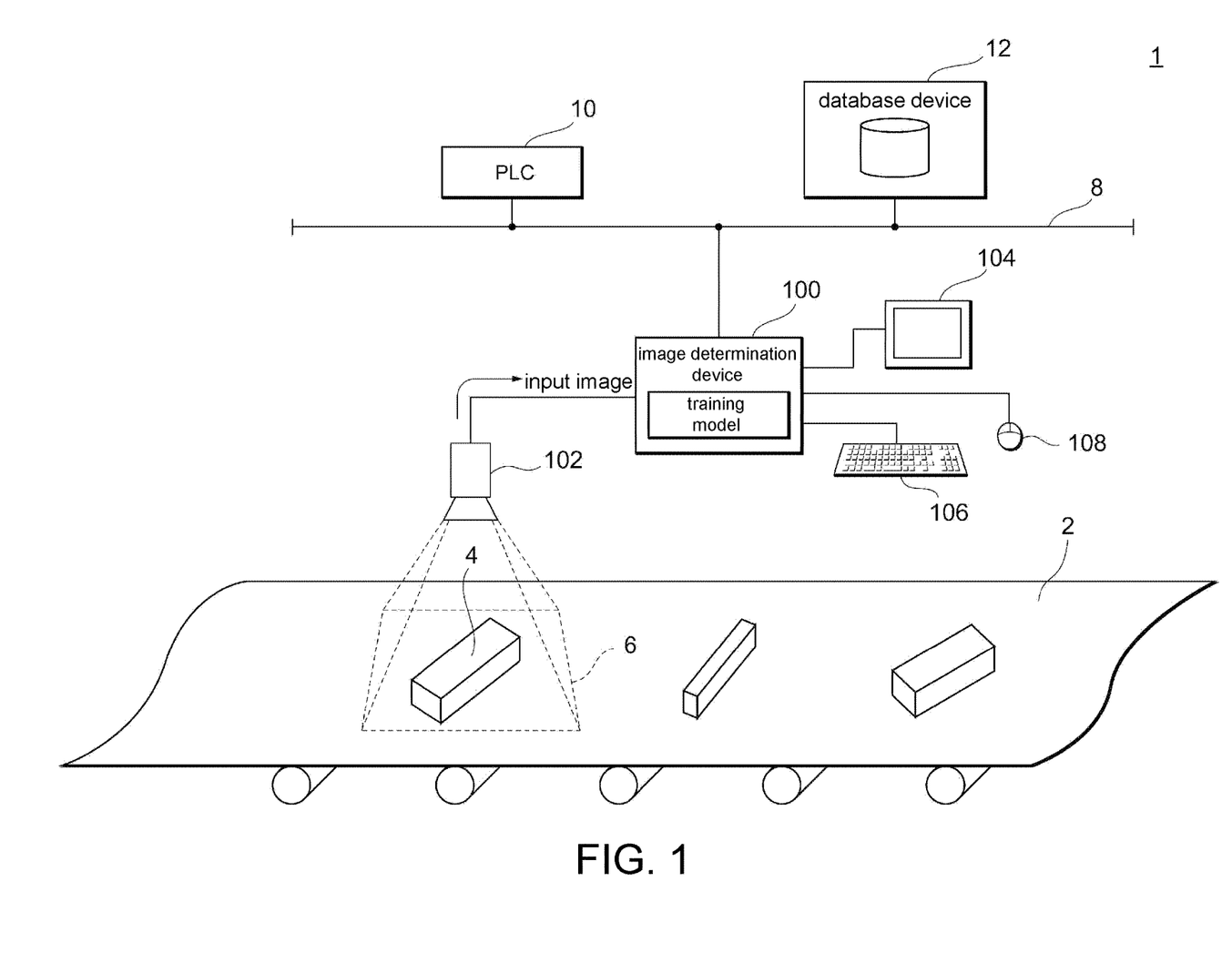
FIG. 1 is a diagram illustrating a configuration example of an image determination system according to an embodiment of the present invention.

FIG. 1 is a diagram illustrating a configuration example of an image determination system 1 according to an embodiment of the present invention. First, an example of a situation to which the present invention is applied will be described. The image determination system 1 according to the present embodiment analyzes an input image generated by capturing an image of an examination target using a training model included in an image determination device 100 and performs examination of a defect and classification of the target. The training model may be trained in advance so as to classify the presence or absence of a defect with respect to an examination target and the type of examination target by using training data. In addition, the training model may be additionally trained in a case where new training data is obtained. The image determination system 1 according to the present embodiment updates a training model so that it becomes clear what features of an input image are focused on to obtain a determination result in a case where a training model is additionally trained. Meanwhile, an examination target includes, for example, work pieces such as parts and products in a manufacturing process.

As illustrated in FIG. 1, for example, the image determination system 1 realizes exterior examination or exterior measurement of a work piece 4, which is an examination target, conveyed on a belt conveyor 2 by performing image measurement processing on an input image obtained by capturing the work piece 4. In the following description, an example applied to examination of the presence or absence of a defect on the surface of the work piece 4, and the like will be described as a typical example of image measurement processing. However, the present invention is not limited thereto, and the example can also be applied to specification of the type of defect, dimensional measurement of an exterior shape of a defect, specification of the type of work piece 4, and the like.

A camera 102, which is an imaging part, is disposed above the belt conveyor 2, and an imaging visual field 6 of the camera 102 is configured to include a predetermined region of the belt conveyor 2. Image data (hereinafter, also referred to as an "input image") generated by the imaging of the camera 102 is transmitted to the image determination device 100. The imaging of the camera 102 is executed periodically or when an event occurs.

The image determination device 100 is connected to a programmable controller (PLC) 10, a database device 12, and the like through a high-order network 8. A measurement result in the image determination device 100 may be transmitted to the PLC 10 and/or the database device 12. Meanwhile, any device may be connected to the high-order network 8, in addition to the PLC 10 and the database device 12.

A display 104 for displaying a state during processing, measurement results, and the like, and a keyboard 106 and a mouse 108 serving as input parts receiving a user's operation may be connected to the image determination device 100.

The image determination device 100 includes a training model generated through machine training. The training model includes one or a plurality of feature extractors and a determiner. The one or plurality of feature extractors receive an image as an input and output feature data indicating a specific feature of the image. The determiner outputs output data indicating a determination result regarding the image on the basis of the feature data output from the one or plurality of feature extractors. Here, the one or plurality of feature extractors may include, for example, an edge extractor that extracts an edge included in the image, a planar part extractor that extracts a planar region included in the image, a background pattern extractor that extracts a background pattern of the image, a binarization region extractor that extracts a binarization region included in the image, and the like. The one or plurality of feature extractors may be a model for extracting a single feature that is easy for each person to understand, may be a machine training model, or may be a rule-based model. The determiner receives one or a plurality of pieces of feature data as inputs and outputs output data indicating a determination result regarding an image. The output data may be data indicating, for example, the presence or absence of a defect which is an examination target, the type of defect, dimensions of an exterior shape of a defect, the type of examination target, and the like. The determiner may be constituted by, for example, a neural network, or may be trained in advance so as to output desired output data by using training data.

Examination conditions such as the type of work piece 4 flowing on a production line and imaging conditions vary depending on a production line and do not necessarily match conditions at the time of training. For this reason, when a preliminarily trained training model is used for a production line, erroneous determination results may be output. Consequently, a training model may be additionally trained by collecting images that cannot be correctly determined by the training model. At this time, when the training model is updated without any restrictions, it becomes unclear whether or not determination is performed by paying attention to the initially assumed features, and thus it may not be possible to explain what features of an image are focused on to obtain a determination result. For this reason, in a case where a training model is introduced into a production line, it becomes difficult to explain the reliability of the training model, which may result in interference with the introduction.

In view of such circumstances, the image determination device 100 according to the present embodiment updates the determiner without making a change to one or a plurality of feature extractors included in a training model in a case where additional training is performed, and thus it is clarified what features of an image are focused on to obtain a determination result. The one or plurality of feature extractors each extract a specific feature of an image, and thus it is possible to specify what features of an image are focused on to obtain a determination result even when the determiner is updated through additional training. Thereby, it becomes easy to explain the reliability of a training model in a case where the training model is introduced into a production line, and thus it is possible to prevent the introduction from being disturbed.

§ 2 Configuration Example

[Hardware Configuration]

Figure 2:
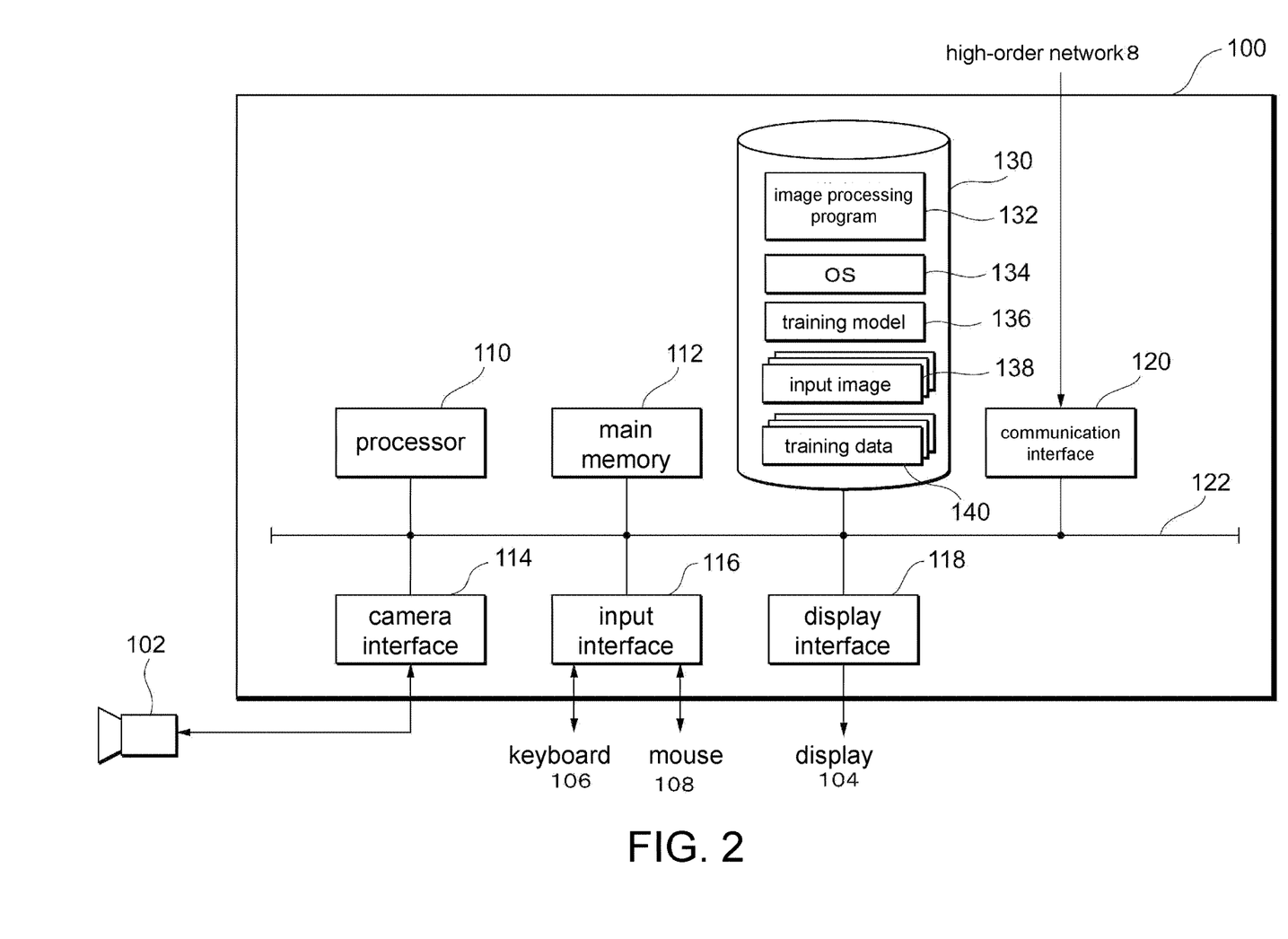
FIG. 2 is a diagram illustrating a hardware configuration of an image determination device according to the present embodiment.

FIG. 2 is a diagram illustrating a hardware configuration of the image determination device 100 according to the present embodiment. The image determination device 100 may be realized using a general-purpose computer configured in accordance with general-purpose computer architecture as an example. The image determination device 100 includes a processor 110, a main memory (main storage part) 112, a camera interface 114, an input interface 116, a display interface 118, a communication interface 120, and a storage (auxiliary storage part) 130. Typically, these components are communicatively connected to each other through an internal bus 122.

The processor 110 realizes functions and processes as described in detail using the next drawing and the subsequent drawings by loading programs stored in the storage 130 in the main memory 112 and executing the programs.

The main memory 112 is constituted by a volatile memory and functions as a work piece memory required to execute a program by the processor 110.

The camera interface is an example of an acquisition part. The camera interface 114 is connected to the camera 102 to acquire an input image captured by the camera 102. The camera interface 114 may give an instruction for an imaging timing or the like to the camera 102.

The input interface 116 is connected to input parts on which a user's operation is performed, such as the keyboard 106 and the mouse 108. The input interface 116 acquires a command indicating an operation performed on the input part by the user, or the like.

The display interface 118 is connected to the display 104 serving as a display part. The display interface 118 outputs various processing results generated by executing programs by the processor 110 to the display 104.

The communication interface 120 takes charge of processing for communicating with the PLC 10, the database device 12, and the like through the high-order network 8.

The storage 130 stores programs for causing a computer to function as the image determination device 100, such as an image processing program 132 and an operating system (OS) 134 for realizing a training model 136. The storage 130 may further store a training model 136, an input image 138 acquired from the camera 102, and training data 140 which is used to train the training model 136. Meanwhile, the training data 140 may be acquired from external equipment such as the database device 12 through the high-order network 8 or may be temporarily stored in the storage 130.

The image processing program 132 stored in the storage 130 may be installed in the image determination device 100 through an optical recording medium such as a digital versatile disc (DVD), a semiconductor recording medium such as a universal serial bus (USB) memory, or the like. Alternatively, the image processing program 132 may be downloaded from a server device or the like on a network.

The image processing program 132 according to the present embodiment does not include all software modules for realizing functions according to the present embodiment, and may cause necessary functions to be provided in cooperation with the OS 134.

The image processing program 132 according to the present embodiment may be provided by being incorporated into a portion of another program. Also in this case, the image processing program 132 itself does not include a module included in the other program to be combined as described above, and processing is executed in cooperation with the other program. In this manner, the image processing program 132 according to the present embodiment may be configured to be incorporated into another program.

FIG. 2 illustrates an example in which the image determination device 100 is realized using a general-purpose computer. However, the present invention is not limited thereto, and all or some of the functions thereof may be realized using a dedicated circuit (for example, an application specific integrated circuit (ASIC), a field-programmable gate array (FPGA), or the like). Further, an external device connected through a network may take charge of some processes.

[Functional Configuration]

Figure 3:
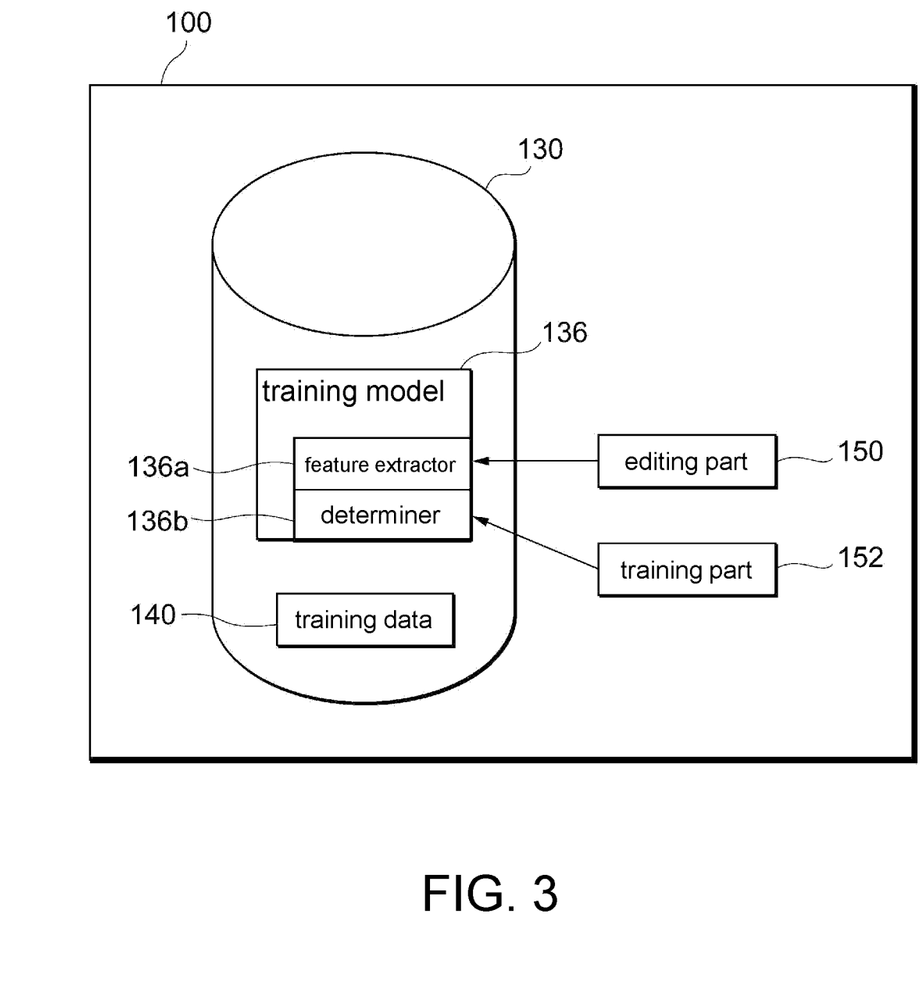
FIG. 3 is a diagram illustrating functional blocks of the image determination device according to the present embodiment.

FIG. 3 is a diagram illustrating functional blocks of the image determination device 100 according to the present embodiment. The image determination device 100 includes the training model 136 stored in the storage 130, an editing part 150, and a training part 152.

The training model 136 includes one or plurality of feature extractors 136a and a determiner 136b. The one or plurality of feature extractors 136a each outputs feature data indicating a specific feature of an image to be examined on the basis of the image. The determiner 136b outputs output data indicating a determination result regarding the image on the basis of the feature data output from the one or plurality of feature extractors 136a.

The training part 152 trains the determiner 136b so as to output output data indicating label data associated with a training image on the basis of feature data output in a case where the training image is input to the one or plurality of feature extractors 136a by using the training data 140 including the training image and the label data. Here, the training image is a previously captured image to be examined. In addition, the label data is data indicating the state of the examination target, and for example, may be data indicating the presence or absence of a defect regarding the examination target, the type of defect, dimensions of an exterior shape of a defect, the type of examination target, and the like. Training processing of the training model 136 may be executed before the image determination device 100 is incorporated into a production line.

The training part 152 performs additional training of the determiner 136b so that output data indicating label data associated with an image which is an examination target included in new training data is output by the determiner 136b, on the basis of feature data output in a case where the image is input to the one or plurality of feature extractors 136a by using the new training data. Here, the additional training may be performed on the determiner 136b, but may not be performed on the one or plurality of feature extractors 136a. In this manner, it is possible to update the determiner 136b so as to be able to perform image determination with higher accuracy while fixing features extracted by the one or plurality of feature extractors 136a.

The training part 152 may perform additional training of the determiner 136b by executing at least any one of updating of parameters of the determiner 136b and updating of the weight of feature data input to the determiner 136b. Here, the parameters of the determiner 136b may be the weight and bias of a node, for example, in a case where the determiner 136b is constituted by a neural network. Further, in a case where feature data input to the determiner 136b is an N type, a weight $w_i$ (i=1 to N) of the feature data may be a positive real number satisfying $\Sigma_{i=1}^{N} w_i = 1$. In a case where the determiner 136b is constituted by a neural network, the training part 152 may update parameters of the determiner 136b and the weight of feature data input to the determiner 136b by a back-propagation method. It is possible to update the determiner through such additional training so that a determination result is obtained with higher accuracy.

The training part 152 may update parameters of some feature extractors of the one or plurality of feature extractors 136a together with the additional training of the determiner 136b. For example, in a case where some feature extractors of the one or plurality of feature extractors 136a are constituted by a neural network and the determiner 136b is constituted by a neural network, the training part 152 may update parameters of the determiner 136b, the weight of feature data input to the determiner 136b, and parameters of some feature extractors of the one or plurality of feature extractors 136a by using a back-propagation method. In this manner, some feature extractors of the one or plurality of feature extractors 136a are collectively updated through additional training, and thus it is possible to update the determiner 136b so that feature extraction is performed with higher accuracy and a determination result is obtained with higher accuracy.

The editing part 150 edits the one or plurality of feature extractors 136a on the basis of an input. It is possible to change features of an image to be extracted by editing the one or plurality of feature extractors 136a. In a case where the one or plurality of feature extractors 136a are edited by the editing part 150, the training part 152 may perform additional training of the determiner 136b by using feature data output from the edited one or plurality of feature extractors 136a. In this manner, it is possible to execute image determination suitable for a usage environment by flexibly changing features of an image to be extracted.

The editing part 150 may add a new feature extractor that outputs feature data indicating a specific feature of an image on the basis of an input. In a case where a new feature extractor is added, the training part 152 may perform additional training of the determiner 136b by using feature data output from the plurality of feature extractors 136a including the added feature extractor. In this manner, it is possible to perform additional training of the training model 136 by clarifying features of an image added to an input to the determiner 136b. Since the added feature extractor is clear, the cause of a change made to determination performed by the training model 136 before and after the addition becomes clear, and it is also easy to return the training model 136 to its original configuration afterwards.

The editing part 150 may delete some of the one or plurality of feature extractors 136a on the basis of an input. In a case where the feature extractors are deleted, the training part 152 may perform additional training of the determiner 136b by using feature data output from the updated one or plurality of feature extractors 136a. In this manner, it is possible to perform additional training of the training model 136 by clarifying feature of an image deleted from an input to the determiner 136b. Since the deleted feature extractors are clear, the cause of a change made to determination performed by the training model 136 before and after the deletion, and it is also easy to return the training model 136 to its original configuration afterwards.

The editing part 150 may edit parameters of the one or plurality of feature extractors 136a on the basis of an input. In a case where the parameters of the one or plurality of feature extractors 136a are edited, the training part 152 may perform additional training of the determiner 136b by using feature data output from the edited one or plurality of feature extractors 136a. In this manner, it is possible to perform additional training of the training model 136 by clarifying change points related to features of an image input to the determiner 136b. Since the edited feature extractors are clear, the cause of a change made to determination performed by the training model 136 before and after the editing, and it is also easy to return the training model 136 to its original configuration afterwards.

§ 3 Operation Example

Figure 4:
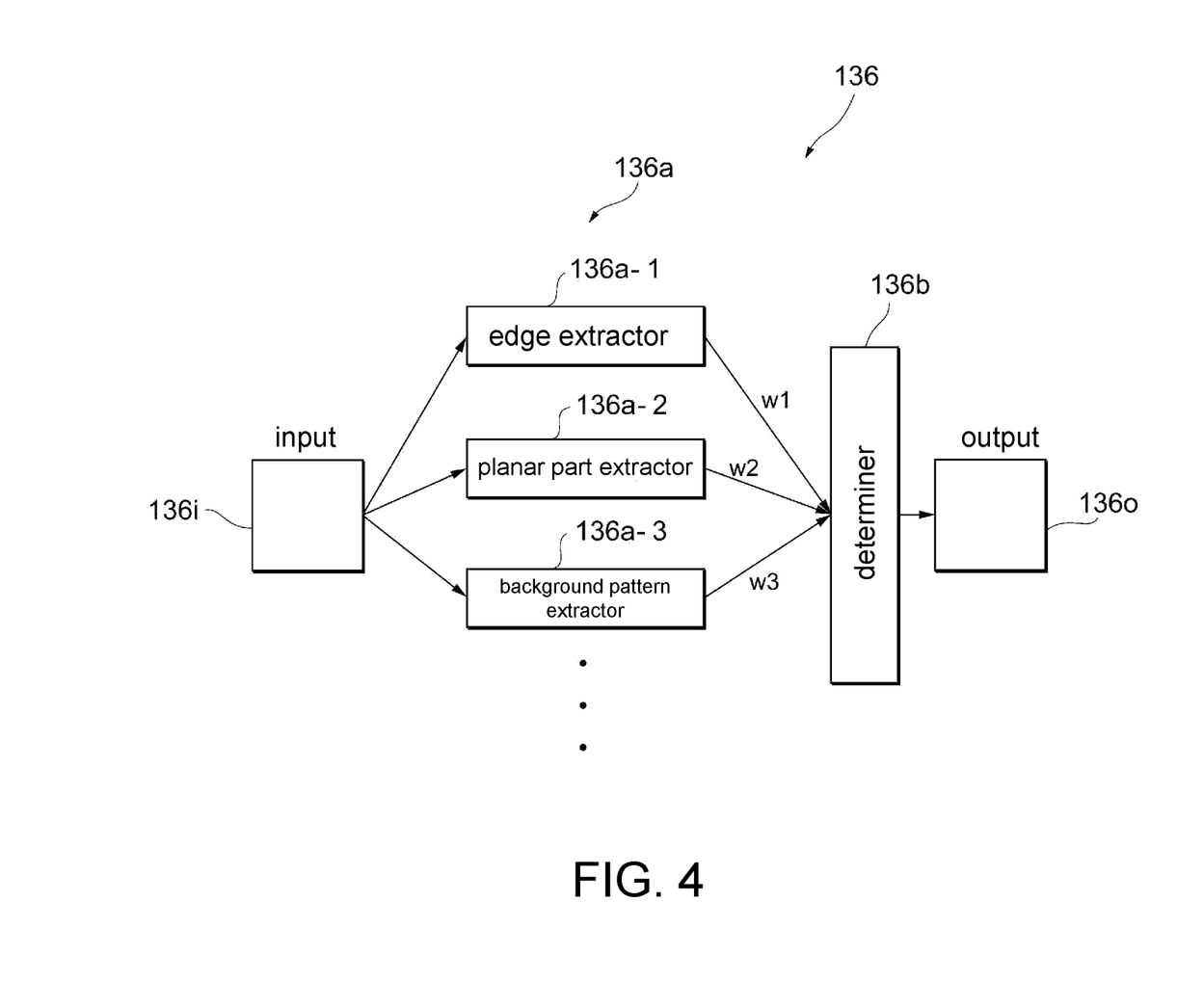
FIG. 4 is a diagram illustrating a configuration example of a training model according to the present embodiment.

FIG. 4 is a diagram illustrating a configuration example of the training model 136 according to the present embodiment. The training model 136 in the present example includes an edge extractor 136a-1, a planar part extractor 136a-2, a background pattern extractor 136a-3, and the determiner 136b.

Each of the edge extractor 136a-1, the planar part extractor 136a-2, and the background pattern extractor 136a-3 receives input data 136i (an image to be examined) as an input and outputs feature data indicating features of the image. Here, the edge extractor 136a-1 extracts an edge included in the image, the planar part extractor 136a-2 extracts a planar region included in the image, and the background pattern extractor 136a-3 extracts a background pattern of the image.

The determiner 136b multiplies feature data output from the edge extractor 136a-1 by a weight w1, multiplies feature data output from the planar part extractor 136a-2 by a weight w2, and multiplies feature data output from the background pattern extractor 136a-3 by a weight w3 as inputs, and outputs output data 136o indicating a determination result related to input data 136i (image).

Figure 5:
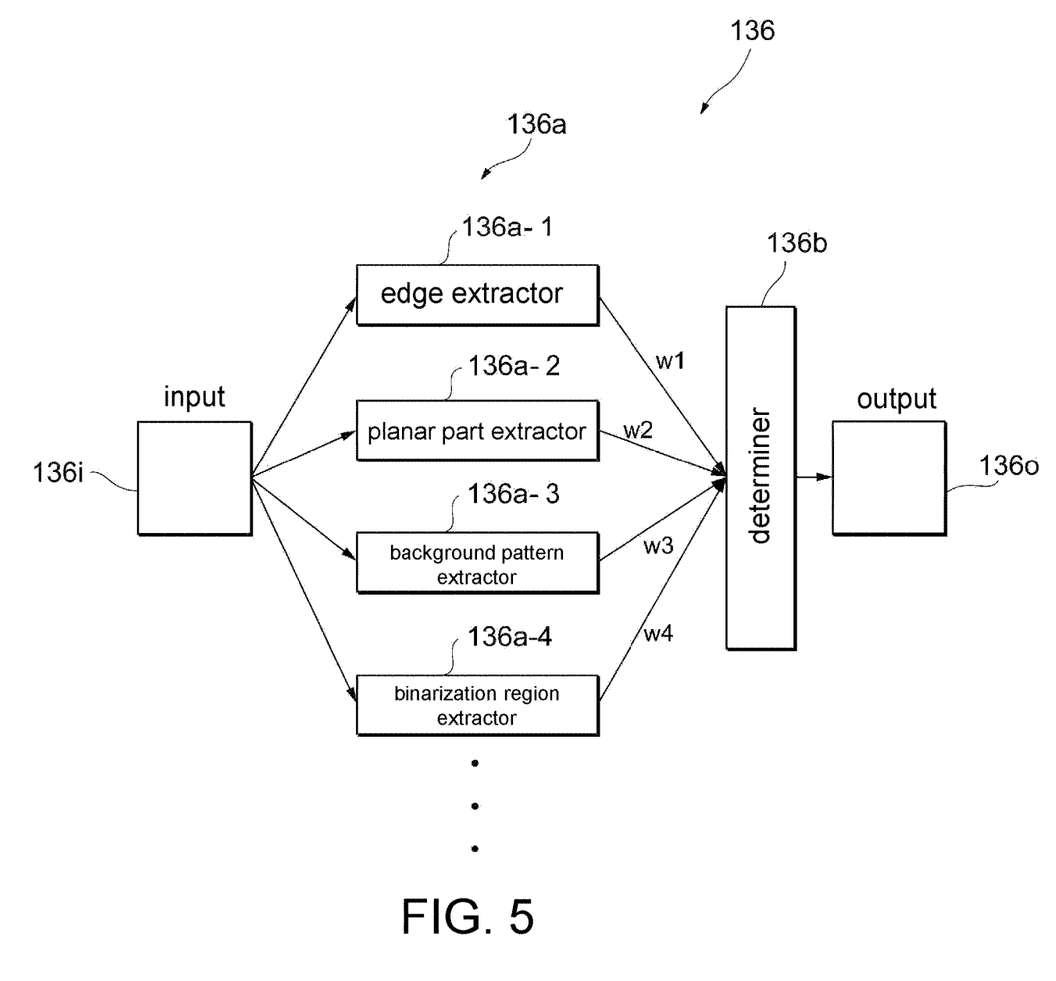
FIG. 5 is a diagram illustrating an editing example of the training model according to the present embodiment.

FIG. 5 is a diagram illustrating an editing example of the training model 136 according to the present embodiment. In the present example, an example in which a feature extractor is added by the editing part 150 is described. Specifically, an example in which a binarization region extractor 136a-4 is added to the three feature extractors illustrated in FIG. 4 is described. The training model 136 in the present example includes the edge extractor 136a-1, the planar part extractor 136a-2, the background pattern extractor 136a-3, the binarization region extractor 136a-4, and the determiner 136b.

The binarization region extractor 136a-4 receives the input data 136i (image to be examined) as an input and outputs feature data indicating features of the image. Here, the binarization region extractor 136a-4 extracts a binarization region included in the image.

The determiner 136b multiplies feature data output from the edge extractor 136a-1 by a weight w1, multiplies feature data output from the planar part extractor 136a-2 by a weight w2, multiplies feature data output from the background pattern extractor 136a-3 by a weight w3, and multiplies feature data output from the binarization region extractor 136a-4 by a weight w4 as inputs, and outputs output data 136o indicating a determination result related to the input data 136i (image). In a case where the binarization region extractor 136a-4 is added, the training part 152 may update the parameters of the determiner 136b and the weights w1 to w4 of the feature data input to the determiner 136b by using new training data.

Meanwhile, a case where a feature extractor is added has been described in the present example, but additional training of the determiner 136b may be similarly performed in a case where a feature extractor is deleted or parameters of a feature extractor are edited.

In addition, for example, when irregular black stains start to adhere to a work piece having a white surface, the editing part 150 may add the binarization region extractor 136a-4 to detect the black stains through additional training. In addition, other examples of the addition of the binarization region extractor 136a-4 by the editing part 150 include a case where binarization processing is newly added to one or a plurality of feature extractors 136a prepared in advance and a case where approximate positions of strains are extracted in binarization processing to detect a defect together with the one or plurality of feature extractors 136a prepared in advance.

Figure 6:
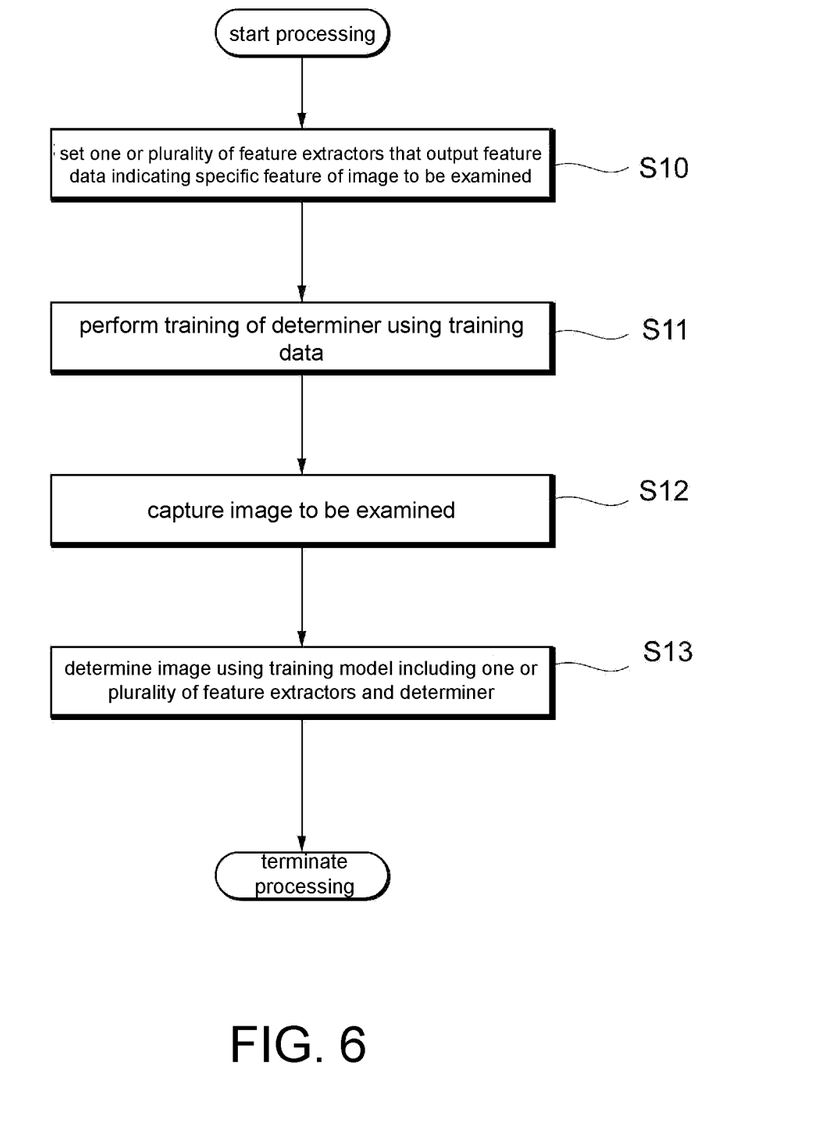
FIG. 6 is a flowchart of image determination processing executed by the image determination device according to the present embodiment.

FIG. 6 is a flowchart of image determination processing executed by the image determination device 100 according to the present embodiment. First, the image determination device 100 sets one or a plurality of feature extractors 136a that output feature data indicating a specific feature of an image to be examined (S10).

Thereafter, the image determination device 100 inputs training image included in training data to the one or plurality of feature extractors 136a, inputs feature data, which is to be output, to the determiner 136*b*, and performs training of the determiner 136*b* so that output data corresponding to label data included in the training data is output (S11). Thus, the preliminary training processing is terminated.

Then, after the image determination device 100 is installed on a production line, an image to be examined is captured by the camera 102 (S12). In addition, the image determination device 100 inputs a newly captured image to the one or plurality of feature extractors 136*a* and inputs feature data, which is to be output, to the determiner 136*b* to determine the image using output data indicating a determination result related to the image (S13). Naturally, the capturing of an image (S12) and the determination processing (S13) may be repeatedly performed. Thus, the image determination processing is terminated.

Figure 7:
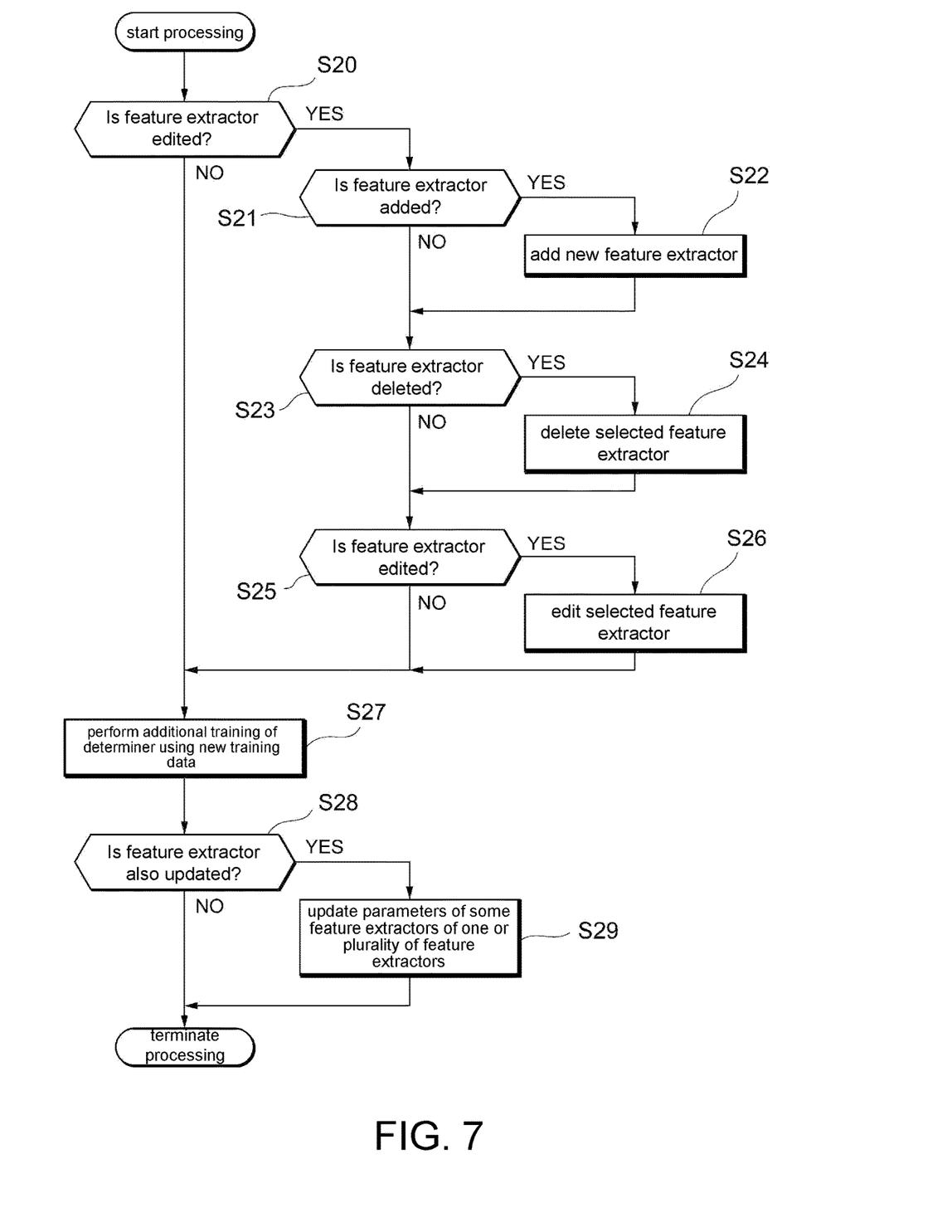
FIG. 7 is a flowchart of additional training processing of a training model executed by the image determination device according to the present embodiment.

FIG. 7 is a flowchart of additional training processing of the training model 136 which is executed by the image determination device 100 according to the present embodiment. First, the image determination device 100 determines whether or not to edit a feature extractor (S20). Whether or not to edit a feature extractor may be determined on the basis of an input.

In a case where a feature extractor is edited (S20: YES), the image determination device 100 determines whether or not to add a feature extractor (S21). In a case where a feature extractor is added on the basis of an input (S21: YES), the image determination device 100 adds a new feature extractor (S22).

In addition, the image determination device 100 determines whether or not to delete a feature extractor (S23). In a case where a feature extractor is deleted on the basis of an input (S23: YES), the image determination device 100 deletes a selected feature extractor (S24).

In addition, the image determination device 100 determines whether or not to edit parameters of a feature extractor (S25). In a case where parameters of a feature extractor are edited on the basis of an input (S25: YES), the image determination device 100 edits the parameters of a selected feature extractor on the basis of an input (S26).

Thereafter, the image determination device 100 inputs a training image included in new training data to the edited one or a plurality of feature extractors, inputs the output feature data to the determiner with predetermined weighting, and performs additional training of the determiner so that label data included in the new training data is reproduced by the output data of the determiner (S27).

Here, in a case where some feature extractors of the one or a plurality of feature extractors are also updated (S28: YES), the image determination device 100 updates parameters of some feature extractors of the one or a plurality of feature extractors (S29).

Meanwhile, the image determination device 100 may repeatedly perform processing for updating parameters of the determiner, the weight of feature data input to the determiner, and parameters of some feature extractors of the one or plurality of feature extractors until a predetermined condition is satisfied. Thus, the additional training processing is terminated.

The above-described embodiment is intended to facilitate the understanding of the present invention and is not intended to limitedly analyze the present invention. The components included in the embodiment and the dispositions, materials, conditions, shapes, sizes, and the like thereof are not limited to those exemplified and can be changed appropriately. In addition, configurations shown in different embodiments can be partially replaced or combined.

Meanwhile, a portion or the entirety of the above-described embodiment can be described as in the following additions, but is not limited to the following description.

[Addition 1]

An image determination device (100) including:
one or a plurality of feature extractors (136*a*) each of which outputs feature data indicating a specific feature of an image to be examined on the basis of the image;
a determiner (136*b*) which outputs output data indicating a determination result related to the image on the basis of the feature data output from the one or plurality of feature extractors (136*a*); and
a training part (152) which causes the determiner (136*b*) to train so as to output the output data indicating label data associated with a training image, on the basis of the feature data which is output in a case where the training image is input to the one or plurality of feature extractors (136*a*) by using training data including the training image and the label data,
wherein the training part (152) performs additional training of the determiner (136*b*) so that the output data indicating the label data associated with the image by the determiner (136*b*), on the basis of the feature data which is output in a case where the image to be examined included in new training data is input to the one or plurality of feature extractors (136*a*) by using the new training data.

[Addition 2]

The image determination device (100) according to Addition 1, wherein the training part (152) performs the additional training of the determiner (136*b*) by executing at least any one of updating of parameters of the determiner (136*b*) and updating of a weight of the feature data which is input to the determiner (136*b*).

[Addition 3]

The image determination device (100) according to Addition 1 or 2, wherein the training part (152) updates parameters of some feature extractors (136*a*) of the one or plurality of feature extractors (136*a*) together with the additional training of the determiner (136*b*).

[Addition 4]

The image determination device (100) according to any one of Additions 1 to 3, further including:
an editing part (150) which edits the one or plurality of feature extractors (136*a*) on the basis of an input.

[Addition 5]

The image determination device (100) according to Addition 4, wherein the editing part (150) adds a new feature extractor (136*a*) that outputs feature data indicating a specific feature of the image on the basis of the input.

[Addition 6]

The image determination device (100) according to Addition 4 or 5, wherein the editing part (150) deletes some of the one or plurality of feature extractors (136*a*) on the basis of the input.

[Addition 7]

The image determination device (100) according to any one of Additions 4 to 6, wherein the editing part (150) edits parameters of the one or plurality of feature extractors (136*a*) on the basis of the input.

[Addition 8]

A training method including:
causing a determiner (136*b*) to train so as to output output data indicating label data associated with a training image, on the basis of feature data which is output in a case where the training image is input to one or a plurality of feature extractors (136a) by using training data including the training image and the label data, the determiner (136b) outputting the output data indicating a determination result related to an image to be examined, on the basis of the feature data output from the one or plurality of feature extractors (136a) each outputting the feature data indicating a specific feature of the image on the basis of the image; and causing the training part (152) to perform additional training of the determiner (136b) so that the output data indicating the label data associated with the image by the determiner (136b), on the basis of the feature data which is output in a case where the image to be examined included in new training data is input to the one or plurality of feature extractors (136a) by using the new training data.

[Addition 9]

An image determination program causing a computation part included in an image determination device (100) to function as:

one or a plurality of feature extractors (136a) each of which outputs feature data indicating a specific feature of an image to be examined on the basis of the image;

a determiner (136b) which outputs output data indicating a determination result related to the image on the basis of the feature data output from the one or plurality of feature extractors (136a); and a training part (152) which causes the determiner (136b) to train so as to output the output data indicating label data associated with a training image, on the basis of the feature data which is output in a case where the training image is input to the one or plurality of feature extractors (136a) by using training data including the training image and the label data, wherein the training part (152) performs additional training of the determiner (136b) so that the output data indicating the label data associated with the image by the determiner (136b), on the basis of the feature data which is output in a case where the image to be examined included in new training data is input to the one or plurality of feature extractors (136a) by using the new training data.

What is claimed is:

1. An image determination device comprising:

one or a plurality of feature extractors each of which outputs feature data indicating a specific feature of an image to be examined on the basis of the image;

a determiner which outputs output data indicating a determination result related to the image on the basis of the feature data output from the one or plurality of feature extractors; and a training part which causes the determiner to train so as to output the output data indicating label data associated with a training image, on the basis of the feature data which is output in a case where the training image is input to the one or plurality of feature extractors by using training data including the training image and the label data, wherein the training part performs additional training of the determiner without making a change to the one or plurality of feature extractors to determine which the one or plurality of feature extractors are focused on to obtain the output data so that the output data indicating the label data associated with the image by the determiner is output, on the basis of the feature data which is output in a case where the image to be examined included in new training data is input to the one or plurality of feature extractors by using the new training data.

2. The image determination device according to claim 1, wherein the training part performs the additional training of the determiner by executing at least any one of updating of parameters of the determiner and updating of a weight of the feature data which is input to the determiner.

3. The image determination device according to claim 2, wherein the training part updates parameters of some feature extractors of the one or plurality of feature extractors together with the additional training of the determiner.

4. The image determination device according to claim 2, further comprising:

an editing part which edits the one or plurality of feature extractors on the basis of an input.

5. The image determination device according to claim 1, wherein the training part updates parameters of some feature extractors of the one or plurality of feature extractors together with the additional training of the determiner.

6. The image determination device according to claim 5, further comprising:

an editing part which edits the one or plurality of feature extractors on the basis of an input.

7. The image determination device according to claim 1, further comprising:

an editing part which edits the one or plurality of feature extractors on the basis of an input.

8. The image determination device according to claim 7, wherein the editing part adds a new feature extractor that outputs the feature data indicating the specific feature of the image on the basis of the input.

9. The image determination device according to claim 8, wherein the editing part deletes some of the one or plurality of feature extractors on the basis of the input.

10. The image determination device according to claim 8, wherein the editing part edits parameters of the one or plurality of feature extractors on the basis of the input.

11. The image determination device according to claim 7, wherein the editing part deletes some of the one or plurality of feature extractors on the basis of the input.

12. The image determination device according to claim 11, wherein the editing part edits parameters of the one or plurality of feature extractors on the basis of the input.

13. The image determination device according to claim 7, wherein the editing part edits parameters of the one or plurality of feature extractors on the basis of the input.

14. A training method comprising:

causing a determiner to train so as to output output data indicating label data associated with a training image, on the basis of feature data which is output in a case where the training image is input to one or a plurality of feature extractors by using training data including the training image and the label data, wherein the determiner outputting the output data indicating a determination result related to an image to be examined, on the basis of the feature data output from the one or plurality of feature extractors each outputting the feature data indicating a specific feature of the image on the basis of the image; and causing the training part to perform additional training of the determiner without making a change to the one or plurality of feature extractors to determine which the one or plurality of feature extractors are focused on to obtain the output data so that the output data indicating the label data associated with the image by the determiner is output, on the basis of the feature data which is output in a case where the image to be examined included in new training data is input to the one or plurality of feature extractors by using the new training data.

15. A non-transitory computer readable medium storing an image determination program causing a computation part included in an image determination device to function as:
one or a plurality of feature extractors each of which outputs feature data indicating a specific feature of an image to be examined on the basis of the image;
a determiner which outputs output data indicating a determination result related to the image on the basis of the feature data output from the one or plurality of feature extractors; and
a training part which causes the determiner to train so as to output the output data indicating label data associated with a training image, on the basis of the feature data which is output in a case where the training image is input to the one or plurality of feature extractors by using training data including the training image and the label data,
wherein the training part performs additional training of the determiner without making a change to the one or plurality of feature extractors to determine which the one or plurality of feature extractors are focused on to obtain the output data so that the output data indicating the label data associated with the image by the determiner is output, on the basis of the feature data which is output in a case where the image to be examined included in new training data is input to the one or plurality of feature extractors by using the new training data.

* * * * *